United States Patent
Wheatley

[11] Patent Number: 6,024,402
[45] Date of Patent: Feb. 15, 2000

[54] ACCESSORY SYSTEM FOR A VEHICLE CARGO BOX

[76] Inventor: Donald G. Wheatley, 4451 Ford Rd., Ann Arbor, Mich. 48105

[21] Appl. No.: 08/976,114

[22] Filed: Nov. 21, 1997

[51] Int. Cl.[7] .................................................. B60P 7/02
[52] U.S. Cl. ...................... 296/100.18; 224/403; 224/404
[58] Field of Search ........................ 296/100.06, 100.12, 296/100.18; 224/403, 404

[56] References Cited

U.S. PATENT DOCUMENTS

| | | |
|---|---|---|
| 4,850,769 | 7/1989 | Matthews . |
| 5,058,652 | 10/1991 | Wheatley et al. . |
| 5,121,960 | 6/1992 | Wheatley . |
| 5,137,320 | 8/1992 | Christensen . |
| 5,228,736 | 7/1993 | Dutton ............................... 296/100.18 |
| 5,301,913 | 4/1994 | Wheatley . |
| 5,340,004 | 8/1994 | Moore ...................................... 224/404 |
| 5,472,256 | 12/1995 | Tucker ................................ 296/100.18 |
| 5,487,585 | 1/1996 | Wheatley ............................ 296/100.18 |
| 5,553,652 | 9/1996 | Rushford ............................ 296/100.18 |
| 5,584,521 | 12/1996 | Hathaway et al. .................. 296/100.18 |
| 5,636,893 | 6/1997 | Wheatley et al. . |
| 5,688,017 | 11/1997 | Bennett ................................ 296/100.17 |

*Primary Examiner*—Gary C. Hoge
*Attorney, Agent, or Firm*—Harness, Dickey & Pierce, P.L.C.

[57] ABSTRACT

Accessory system for a vehicle cargo box such as a pickup truck is provided in which multiple accessories can be simultaneously attached to the pickup box. These accessories include a tonneau cover, bed rails, bicycle racks, ski racks, cargo netting, etc. The system includes side rails with a tonneau cover mounting portion along an inboard side that enables bed rails to be attached outward of the tonneau cover enabling both to be simultaneously installed on the vehicle. Accessories can also be mounted below the tonneau cover which can be covered by the tonneau cover if desired.

20 Claims, 7 Drawing Sheets

ACCESSORY SYSTEM FOR A VEHICLE CARGO BOX

BACKGROUND AND SUMMARY OF THE INVENTION

The present invention relates to an accessory system for a motor vehicle and in particular to a rail system for mounting accessories to a motor vehicle cargo area which has opposed upright side walls and an open top such as a pickup truck cargo box.

Owners of pickup trucks have always attached various accessories to the truck cargo box for many reasons including enhancing the vehicle appearance, making the cargo box more useful and protecting both the cargo box and cargo therein. One popular accessory is a tonneau cover to cover the cargo box open top and cargo. Bed rails are another accessory and are mounted to the upper end of the cargo box side walls to provide a handle, to protect the upper end of the side walls and to enhance the vehicle's appearance. Bicycle racks, ski racks, etc. have also been attached to cargo boxes to enable safe transport of bicycles, skis, etc. However, in the past, it has generally been impossible to install more than one of these devices at a given time on the cargo box. In other words, if a tonneau cover is present, it is not possible or practical to include bed rails on the cargo box or a bicycle rack, etc.

Accordingly, it is an object of the present invention to provide an accessory system for a pickup truck cargo box that mounts multiple accessories to the cargo box simultaneously.

The accessory system of the present invention utilizes two side attachment rails, one upon the upper end of each side wall of the cargo box. Front and rear rails are attached to the ends of the side rails forming a rectangular frame structure mounted at the top of the cargo box. The side rails extend generally the length of the vehicle cargo box. Once installed on the cargo box, the rails provide an inwardly open mounting channel to which various accessories can be attached to accommodate certain specialty cargo. For example, cross bars that extend across the cargo box are attached to the side rail's mounting channels. Bicycles, skis, surfboards, sail boards, etc. can be carried on the cross bars. Furthermore, cargo tie down anchors can be attached to the mounting channels to provide anchors for ropes to secure cargo within the cargo box.

In addition, the rails are configured to mount a tonneau cover to the rails which extends over the open cargo box. Previously, when a cargo box was covered with a tonneau cover, it was not possible to also install bed rails to the cargo box side walls. The side rails of the present invention provide for bed rail attachment to the side rails at a location outboard from the tonneau cover. Thus, both the tonneau cover and the bed rails can be simultaneously installed on the cargo box.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
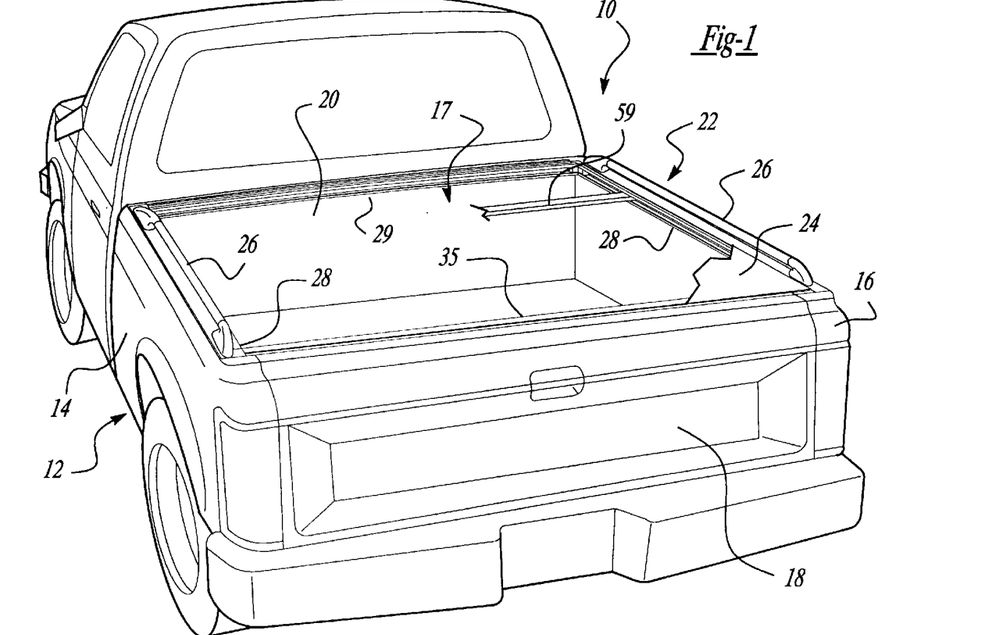
FIG. 1 is a perspective view of a pickup truck having the accessory system of the present invention installed thereon.

The accessory system of the present invention is shown in FIG. 1 and installed upon pickup truck 10. The pickup truck 10 includes a cargo box 12 having spaced apart opposite side walls 14 and 16, a pivotable tail gate 18 and a front wall 20. The side walls define an interior space 17 therebetween.

The accessory system 22 of the present invention is attached to the cargo box and is shown with a portion of a flexible fabric tonneau cover 24 covering the open upper end of the cargo box. Furthermore, a pair of bed rails 26, are mounted to the cargo box side walls.

Figure 2:
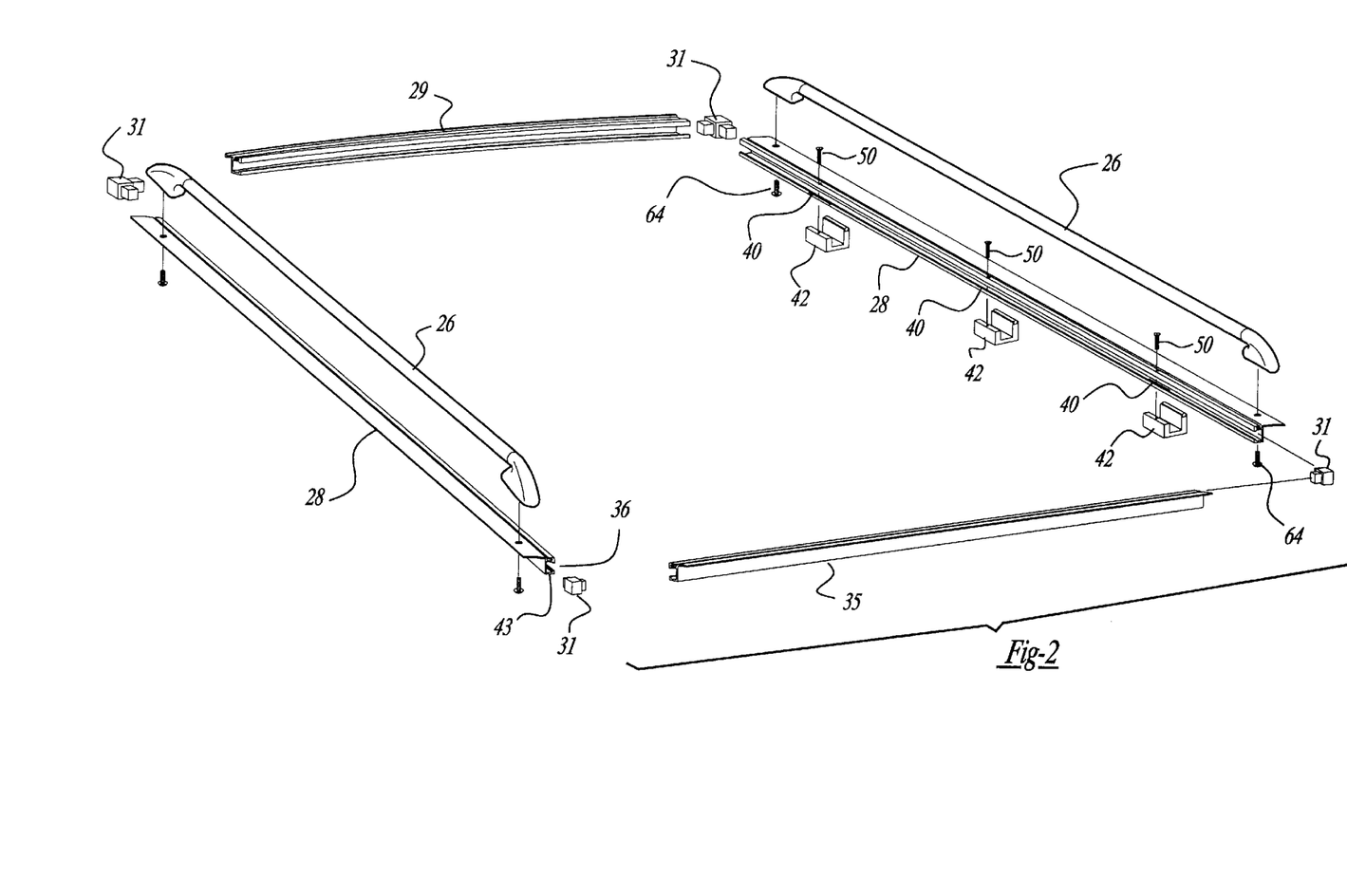
FIG. 2 is an exploded perspective view of the frame portion and bed rails of the accessory system of the present invention.
Figure 3:
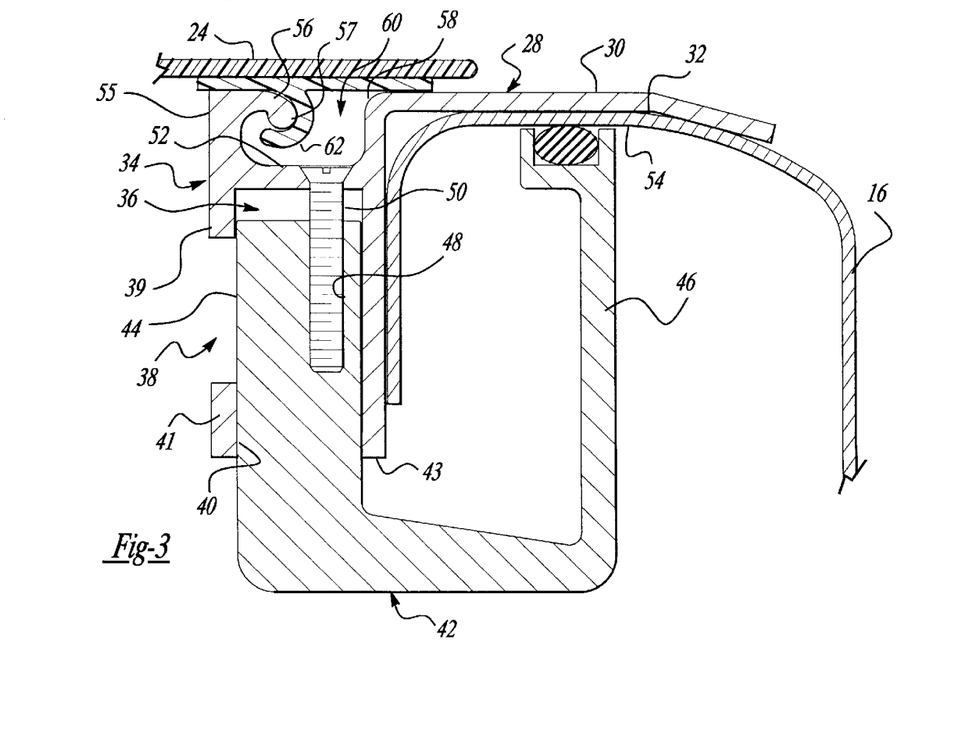
FIG. 3 is a sectional view of the accessory system as seen from substantially line 3—3 of FIG. 1.

With reference to FIGS. 2 and 3, the accessory system is shown in greater detail. The system 22 includes a pair of side rails 28, with one side rail attached to the upper end of each of the cargo box side walls and extending generally the length thereof. A front rail 29 is attached to the front ends of the two side rails 28 by corner blocks 31 and rests upon the cargo box front wall 20. The blocks 31 have legs inserted into the side and front rails and are attached thereto by fasteners, such as thumb screws, etc. A rear, or tail gate, rail 35 rests upon the tail gate 18 and is attached to the rear ends of the side rails 28 by additional corner blocks 31. The side, front and rear rails form a generally rectangular frame sized to fit upon the top of the cargo box.

A rail 28 is shown in section in FIG. 3. The rail 28 includes an upper wall, or flange, 30 that rests upon and generally overlies the upper end 32 of the cargo box side wall forming a cap for the side wall. At the inboard edge of the upper wall 30, a tonneau cover mounting portion 34 is provided which is described in greater detail below. Extending downward from the inboard edge of the upper wall 30, into the cargo box, is a mounting channel 36. The mounting channel 36 is a generally rectangular channel having an inboard facing opening 38 extending the length of the rail 28. The inboard wall of the channel is formed by a downward extending upper flange 39 and an upward extending lower flange 41. The flanges 39 and 41 are spaced apart forming the opening 38. The opening 38 is considered inward or inboard facing since it faces the interior of the cargo box.

At discrete locations along the length of the side rails, the bottom wall 43 of the channel has clamp apertures 40 therein. U-shape clamp members 42 are used to clamp the side rail 28 to the cargo box side wall. The clamp members have inboard and outboard legs 44 and 46 respectively spaced from one another. The inboard leg 44 has a threaded bore 48 extending downwardly therein. The inboard leg 44 is inserted upwardly into the channel 36 through a clamp aperture 40 in the bottom of the channel. A screw or bolt 50 is inserted downward through the channel upper wall 52 and threaded into the bore 48. As the screw or bolt 50 is tightened, the outboard leg 46 of the clamp member is drawn up to engage the underside 54 of the cargo box side wall upper end. A plurality of clamp members 42 are spaced along the length of each side rail to secure the side rails to the cargo box.

Only the side rails are clamped to the cargo box since only the box side walls have an upper horizontal wall that can be reached on its underside with a clamp. The front and tail gate rails include mounting channels 36 as these are used to receive the corner blocks 31. These rails also have a tonneau cover mounting portion but typically do not have as large an upper wall, or flange, 30 since the cargo box front wall and tail gate are not as thick as the side walls.

In the embodiment shown in FIG. 3, the tonneau mounting portion 34 is formed by a recess 60 in the upper wall 30 of the rail. A lip 56 extends outward from the inner wall 55 of the recess to a distal end 57. The distal end 57 is spaced from the mounting rail upper wall 30, leaving an opening 58 into the recess 60. The flexible fabric tonneau cover 24 has an elongated J-strip 62 attached along its outer edge. The J-strip flexes to curl around the distal end of lip 56 to attach the flexible fabric tonneau cover to the side rail. A plurality of slats 59 span across the cargo box to support the middle of the flexible fabric. Slats 59 are attached at their ends to the channels 36 in side rails 28.

Figure 11:
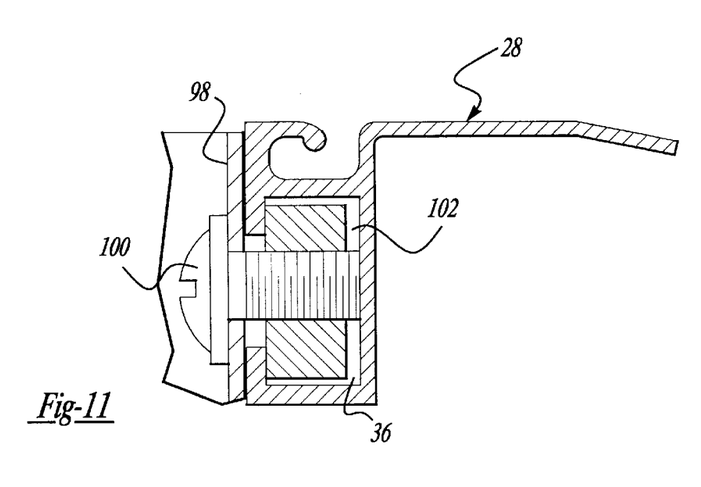
FIG. 11 is a sectional view showing the attachment of the toolbox to a side attachment rail.
Figure 12:
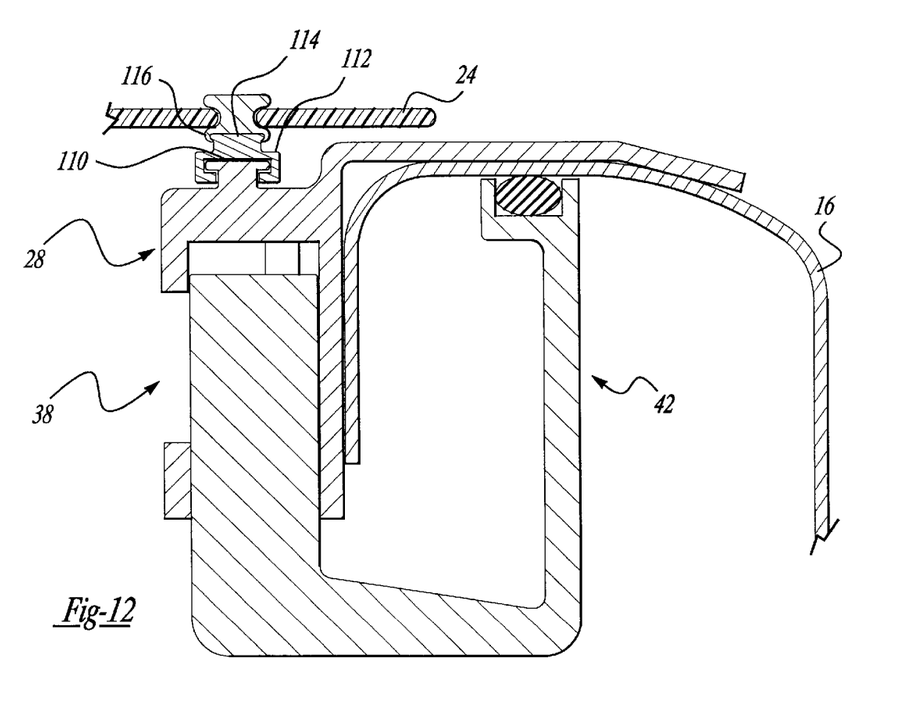
FIG. 12 is an alternative embodiment of the side rail illustrating a snap attachment of the tonneau cover.

With reference to FIG. 11, a snap attachment of the flexible fabric tonneau cover 24 to the rail 28 is shown. In this embodiment, the tonneau cover mounting portion of the rail includes a T-shaped portion 110 to which sliding snap fasteners 112 are mounted. The snap fasteners 112 have a first snap portion 114 coupled thereto. The flexible fabric of the tonneau cover includes complementary shaped second snap fastener portions 116 which engage the first snap fastener portions 114 to couple the fabric to the rail 28. Other fabric tonneau cover mounting mechanisms, such as Velcro®, V strips, magnetic strips etc. can be used with an appropriately configured tonneau cover mounting portion of the rail.

The rails are preferably made by extrusion, typically of aluminum. However, other manufacturing processes and materials including plastics can be used if desired.

The placement of the tonneau mounting portion 34 along the inboard edge of the side rail enables other accessories, such as the bed rails 26, to be attached to the side rails 28, outboard of and above the tonneau cover. The rail upper wall 30, which extends over the top of the cargo box sidewalls, thus serves as an accessory mounting portion as well as a cap for the cargo box sidewall. The bed rails can be attached by threaded fasteners, such as a screw 64 or bolt, inserted upwardly, through the upper wall 30 and into the bed rails. Other accessories can be attached to the flange as well.

Figure 4:
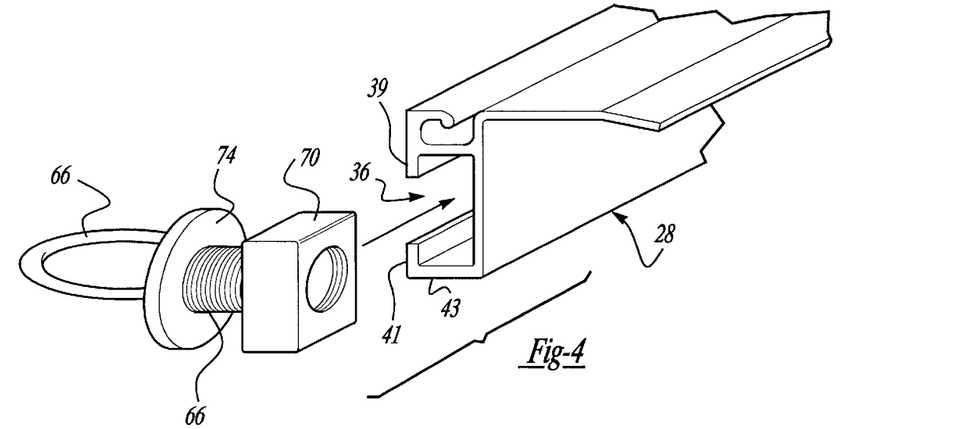
FIG. 4 is a perspective view of a cargo tie-down anchor and one of the side attachment rails.

With reference to FIG. 4, a tie down ring or anchor 66 is shown for mounting to the channel 36 of the side rails 28. The ring is attached to a stud 68 which is threaded into a nut 70. The nut 70 is sized to slide longitudinally within the mounting channel 36 but not turn in the channel. Once the nut is located in the channel where desired, the tie down ring is further threaded into the nut, until the stud shoulder 74 engages the upper and lower flanges 39 and 41 of the channel and pinches the flanges between the nut 70 and shoulder 74 to hold the tie down ring in place. Multiple tie down rings can be installed to each of the rails to provide anchors for tying ropes or other devices for securing cargo within the cargo box.

Figure 5:
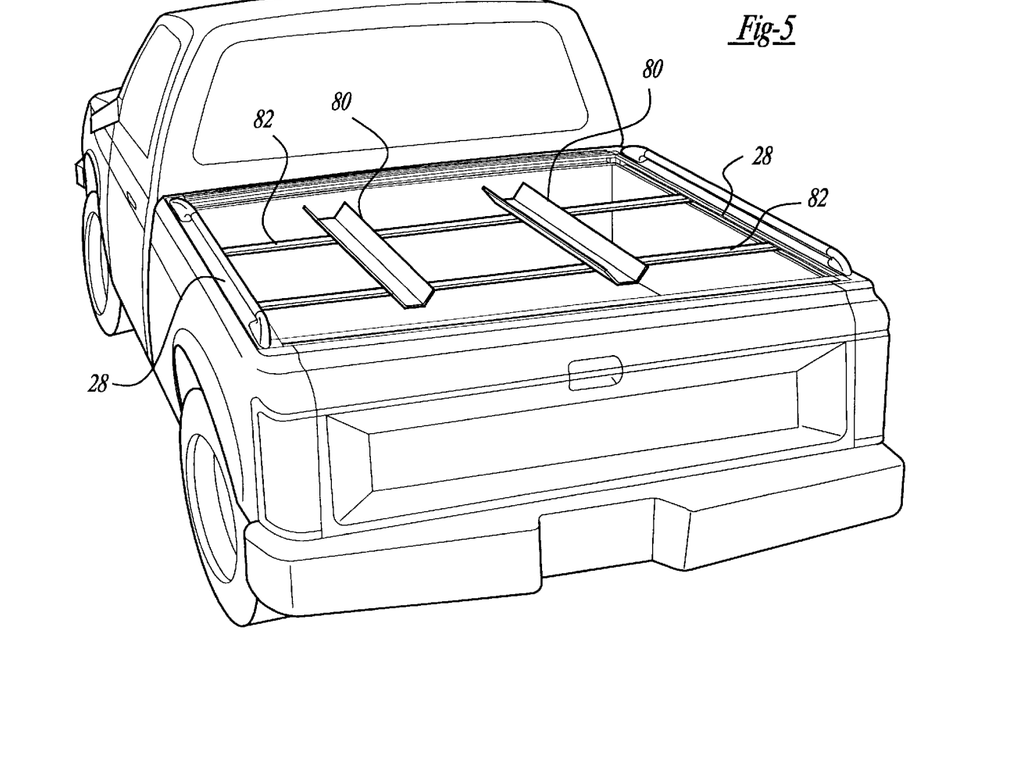
FIG. 5 is a perspective view of a pickup cargo box showing a bicycle rack attached to the side rails along with cargo box bed rails.
Figure 6:
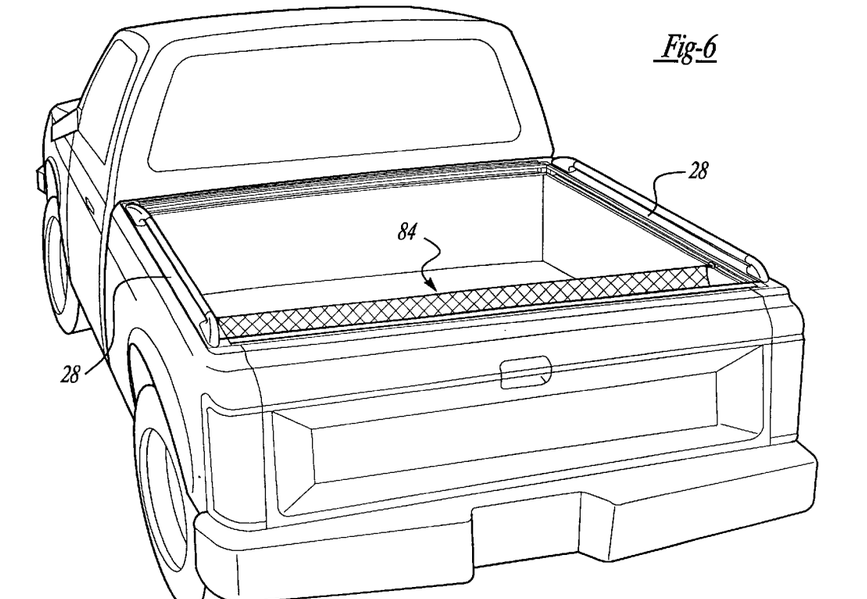
FIG. 6 is a perspective view of a pickup truck cargo box with a tailgate cargo net attached to the side rails and tailgate.

With reference to FIG. 5, a pair of bicycle racks 80 are shown mounted to the side rails 28. A pair of cross bars 82 are attached to the channels 36 of the two rails 28 and span across the cargo box. The bicycle racks 80 are coupled to the cross bars 82. Since the racks 80, and bicycles (not shown) carried on the racks, extend upward above the upper end of the cargo box, it is not possible to cover the box with the flexible fabric tonneau cover 24 at the same time the bicycle racks are installed. However, the bed rails 26 can remain on the cargo box. With cross bars that are configured to extend downwardly into the cargo box, it is possible to leave a bicycle rack, etc. attached to the side rails and cover the rack with the tonneau cover when a bicycle is not mounted thereto.

With reference to FIGS. 6, 7, 8 and 9, a tail gate cargo netting 84 is shown for confining cargo, such as grocery bags, in a small area of the cargo box. A pair of tie down rings 66 are installed, one in each side rail 28, a short distance forward from the tail gate 18. The cargo netting 84 extends between the tie down rings. The cargo netting is also attached to anchors 86 at the upper end of the tail gate, near the left and right sides, such that the inside surface of the tail gate is covered by the cargo netting. The anchors 86 are mushroom shaped and secured to the tailgate by a fastener, such as a screw 118 through the center of the anchors. A mounting loop 120 at a corner of the netting stretches over the mushroom headed anchor.

Figure 7:
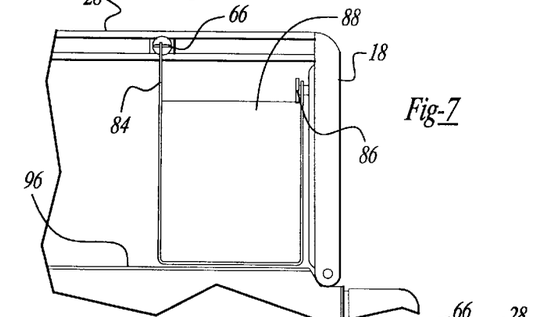
FIG. 7 is a side view as seen from substantially line 7—7 with the tail gate in a raised position.
Figure 8:
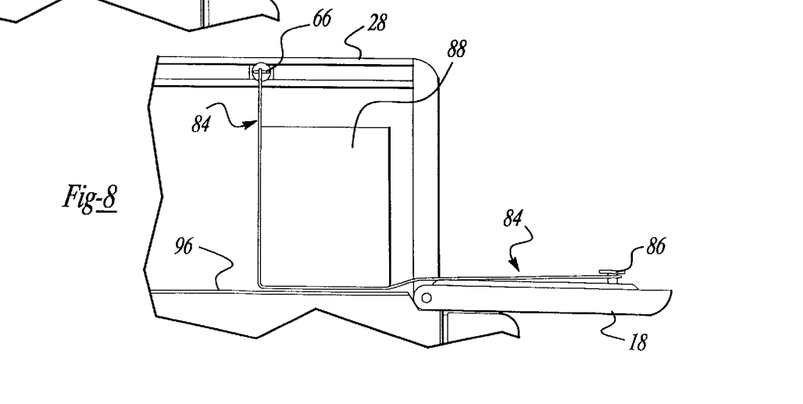
FIG. 8 is a side view similar to FIG. 7 with the tail gate in a lowered position.
Figure 9:
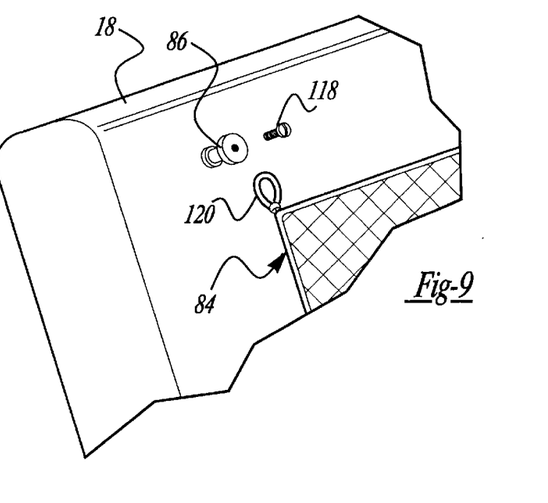
FIG. 9 is a perspective view of a corner portion of a tailgate illustrating a tie down anchor secured thereto.

When the tail gate is down, as shown in FIG. 8, grocery bags 88 can be placed in the cargo box and upon the netting 84. When the tail gate is raised, as shown in FIG. 7, the grocery bags 88 are confined within the netting and are not able to move about in the cargo box during vehicle operation. This enables small objects to be conveniently and easily confined within the cargo box. The flexible fabric tonneau cover 24 can be installed over the cargo netting 84 to conceal the cargo as well. The netting could be mounted solely to the side rails with a pair of front tie down rings and a pair of rear tie down rings all attached to the side rails. The netting could then be placed anywhere in the cargo box as desired.

Figure 10:
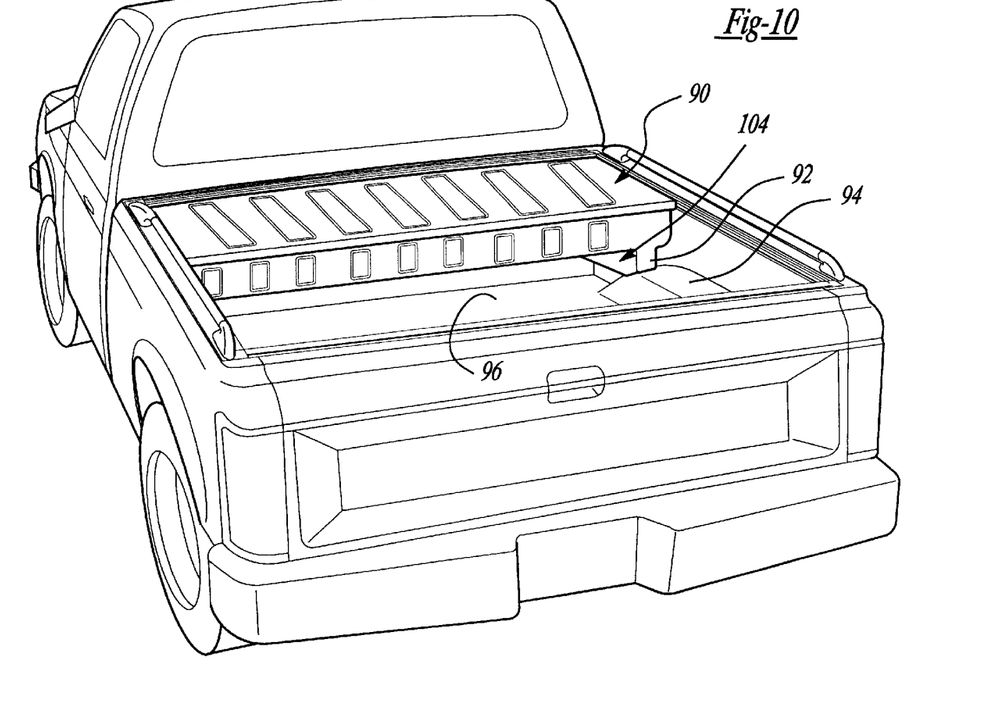
FIG. 10 is a perspective view of the pickup truck cargo box showing a toolbox attached to the accessory system.

With reference to FIGS. 10 and 11, a tool box 90 is installed in the cargo box. The tool box is configured with feet 92 on each side that conform to the cargo box load floor 96 and wheel well 94. The side wall 98 of the tool box is secured to the mounting rail 28 by a threaded fastener 100 extending through the tool box wall and into a nut 102 contained within the rail channel 36. The tool box can be configured with a low profile that does not rise above the side rails 28, enabling the tonneau cover to be installed over the tool box if desired. Furthermore, the tool box can be configured with a clearance 104 between the bottom of the tool box and the cargo box floor 96 to allow cargo to be carried beneath the tool box.

Figure 13:
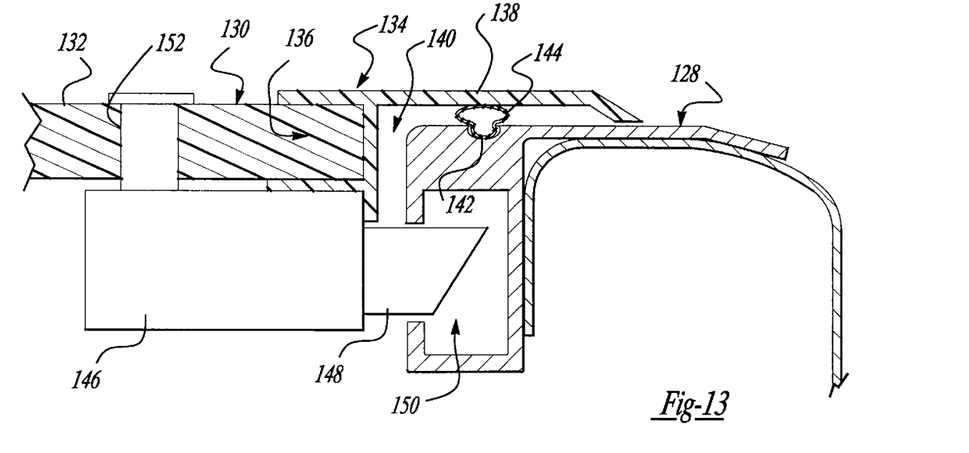
FIG. 13 is an another alternative embodiment illustrating a hard panel tonneau cover coupled thereto.
Figure 14:
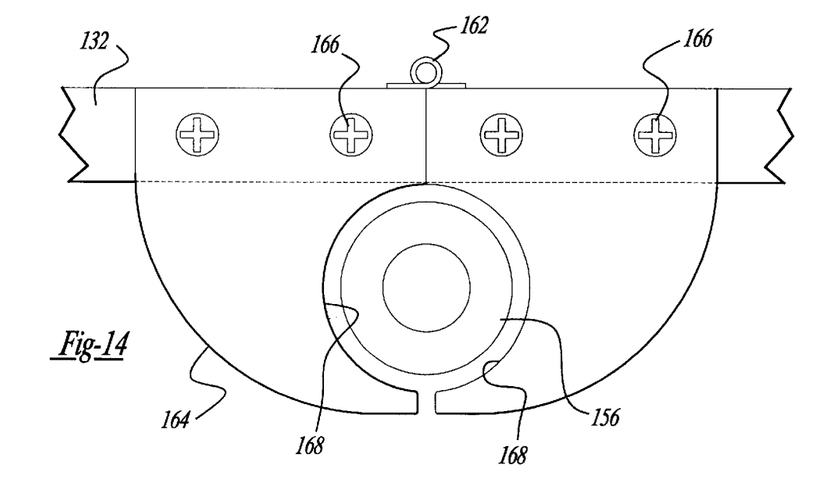
FIG. 14 is a side view of the hard panel tonneau cover shown in FIG. 13 showing a hinge joint coupled to a pin on the side rail.
Figure 15:
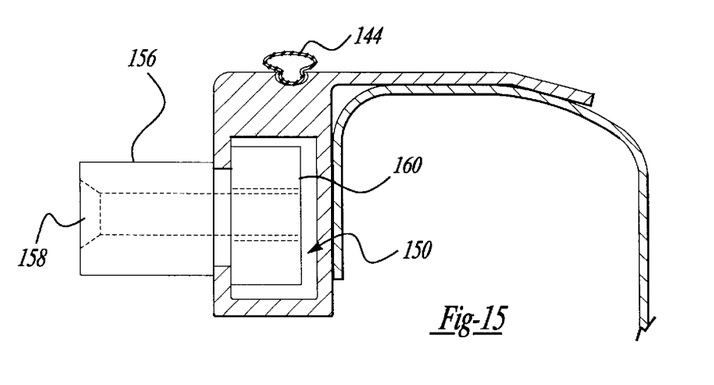
FIG. 15 is an elevational view of the pin shown in FIG. 14.

With reference to FIGS. 13 through 15, a hard panel tonneau cover is shown attached to a side rail 128. The hard panel tonneau cover 130 is made of a plurality of panels 132 coupled together by hinges as shown in FIG. 14. Additional details concerning the construction of the hard panel tonneau cover are contained in U.S. Pat. No. 5,636,893, incorporated herein by reference. The panels 132 are bounded on their outboard edges by extruded aluminum frame members 134. The frame members 134 have a channel 136 which receives the edge of the panels 132. The frame members 134 further have an outward extending flange 138 which overlies the side rail 128 and rests upon a tonneau cover mounting portion 140 of the side rail. The tonneau cover mounting portion has a groove 142 which receives a resilient seal 144 against which the flange 138 rests to provide a water tight seal between the tonneau cover and the rail 128.

The tonneau cover includes a latch mechanism 146 at the front and/or rear ends on the underside of a panel 132. The latch mechanism 146 has a spring biased catch 148 which is received into the inwardly open channel 150 of the side rail. The latch mechanism 146 is operable from above the tonneau cover by a key lock 152 or other release. The latch mechanisms prevent the front and/or rear panels from being opened.

At a hinge 162 between the panels 132, the cover is secured to a pin 156 mounted to the rail channel 150 shown in FIGS. 14 and 15. The pin has a screw 158 extending therethrough into the channel and into a nut 160 within the channel. Adjacent the hinge 162, a pair of jaws 164 are attached to the panels by screws or other fasteners 166. The jaws each have a concave edge 168 which, wrap around the pin 156 from opposite sides. Once in position, the panels 132 cannot be raised vertically from the cargo box. The panels can only be rotated about the hinge 162. The pin 156 is used to prevent unintended lifting of a panel while the latch 146 is used to prevent unintended rotation of a front or rear panel.

The accessory system of the present invention provides an integrated accessory system for a cargo box which enables multiple accessories to be individually and/or simultaneously attached to the pick-up cargo box. The accessories include but are not limited to a tonneau cover, bed rails, bicycle racks, ski racks, cargo netting, tool box, etc. The system includes side rails attached to the upper ends of the cargo box side walls to which the multiple accessories are attached.

The invention has been described in the context of a pick-up truck cargo box. The invention can be used with other vehicles having a space defined by spaced apart walls.

It is to be understood that the invention is not limited to the exact construction illustrated and described above, but that various changes and modifications may be made without departing from the spirit and scope of the invention as defined in the following claims.

I claim:

1. An accessory system for a vehicle body having spaced elongated vertical side walls having upper ends, the side walls defining an interior space therebetween which is open from above, the accessory system comprising a tonneau cover, an elongated side rail extending along each side wall adjacent the upper ends thereof, each side rail having a tonneau cover mounting portion for mounting the tonneau cover to the side rail, a first accessory mounting portion outboard of the tonneau cover mounting portion for mounting an accessory to the rails outboard of the tonneau cover mounting portion, the first accessory mounting portion including a generally horizontal substantially flat flange extending outward from the tonneau cover mounting portion and covering the upper ends of the side walls and providing the appearance of a side wall cap, a second accessory mounting portion below the tonneau cover mounting portion for mounting an accessory to the rails below the tonneau cover mounting portion, whereby the tonneau cover can be mounted to the rails between the two spaced side walls while a first accessory can be mounted to the first accessory mounting portion above the tonneau cover and a second accessory can be mounted to the second accessory mounting portion below the tonneau cover.

2. The accessory system of claim 1 further comprising a bed rail attached to the first accessory mounting portion of each rail and extending lengthwise along at least a portion of each side rail.

3. The accessory system of claim 1 wherein the second accessory mounting portion includes an inwardly open channel open to the interior space of the vehicle body.

4. The accessory system of claim 1 further comprising:
a flexible fabric tonneau cover of a size to extend between the two side rails and having means for attaching to the tonneau cover mounting portion of each side rail; and
a slat extending between the side rails, the slat having opposite ends with means for attaching the slat to the second accessory mounting portion of each rail, the slat arching upward between the side rails to support the flexible fabric tonneau cover between the rails.

5. The accessory system of claim 4 wherein the tonneau cover mounting portion includes an elongated recess extending downward in a top surface of each side rail and an lip extending outward from an inner edge of the recess partially covering the recess and terminating in a distal end and the flexible fabric tonneau cover includes an elongated flexible hook adjacent an outer edge of the flexible fabric which wraps around the distal end of the lip to mount the flexible fabric to the side rails.

6. The accessory system of claim 4 wherein the tonneau cover mounting portion includes a plurality of first snap fastener portions coupled to the rail and the flexible fabric tonneau cover includes a plurality of complementary second snap fastener portions adjacent an outer edge of the flexible fabric which snap engage with said first snap fastener portions to mount the flexible fabric to the rails.

7. The accessory system of claim 1 wherein:
the tonneau cover is of a size to extend between the two side rails, the tonneau cover having two or more hard panels pivotally connected to one another to fold in an accordion-style fashion, each of said panels having side edges overlying the tonneau cover mounting portion of the rails.

8. The accessory system of claim 7 further comprising a seal member carried by the tonneau for engagement with the rail to prevent water from passing therebetween.

9. The accessory system of claim 7 further comprising latch means engagable with the second accessory mounting portion for securing the tonneau cover to the rail.

10. The accessory system of claim 7 further comprising a pin mounted to and extending from the second accessory mounting portion which the tonneau cover grasps to prevent lifting of the tonneau cover from the rail.

11. The accessory system of claim 1 further comprising at least one cross bar having ends with means for attaching the cross bar to the second accessory mounting portion of each side rail whereby the cross bar extends between the two cargo box side walls.

12. The accessory system of claim 1 further comprising a tool box positioned adjacent between the side rails and having one end attached to the second accessory mounting portion of one of the side rails and another end adjacent to and attached to the second accessory mounting portion of the other of the side rails.

13. The accessory system of claim 12 wherein the tool box upper end is below the tonneau cover mounting portion whereby a tonneau cover can be mounted to the rails over the tool box.

14. An accessory system for a vehicle body having spaced elongated vertical side walls having upper ends, the side walls defining an interior space therebetween which is open from above, the accessory system comprising, an elongated side rail extending along each side wall adjacent the upper ends thereof, each side rail having a tonneau cover mounting portion for mounting a tonneau cover to the side rail, a first accessory mounting portion outboard of the tonneau cover mounting portion for mounting an accessory to the rails outboard of the tonneau cover mounting portion, the first accessory mounting portion extending outward from the tonneau cover mounting and at least partially covering the upper ends of the side walls, a second accessory mounting portion below the tonneau cover mounting portion for mounting an accessory to the rails below the tonneau cover mounting portion, the second accessory mounting portion including an inwardly open channel open to the interior space of the vehicle body, whereby the tonneau cover can be mounted to the rails between the two spaced side walls while a first accessory can be mounted to the first accessory mounting portion above the tonneau cover and a second accessory can be mounted to the second accessory mounting portion below the tonneau cover, said accessory system further comprising at least one U-shaped clamp member having an inner and an outer leg with the inner leg extending upward into the channel through an opening in a bottom wall thereof and the outer leg extending upward and engaging an underside of the side wall upper end; and     a fastener for holding the at least one clamp member in place relative to the rail whereby the rail is clamped to the side wall.

15. Apparatus for confining cargo within a pickup truck cargo box, the cargo box having a load floor, spaced apart side walls, a front wall and a pivoting tail gate all having upper ends forming the top of the cargo box, the apparatus comprising:

a cargo netting having four attachment members; and means for coupling the netting attachment members to the cargo box, the means for coupling including left and right front anchors mounted to the cargo box near the top thereof adjacent left and right sides of the cargo box and left and right rear anchors mounted to the cargo box near the top thereof adjacent left and right sides of the cargo box and spaced rearward of the front anchors;

the netting having a size to extend downward from the front anchors toward the load floor and back up to the rear anchors to confine cargo placed in the netting to a location within the cargo box between the front and rear anchors.

16. The apparatus of claim 15 wherein the rear anchors are attached to the tail gate at left and right sides thereof whereby when the tail gate is lowered, a rear portion of the netting is lowered providing access to the cargo therein.

17. The apparatus of claim 15 further comprising left and right side rails attached to the upper ends of the cargo box side walls and extending generally the length thereof and wherein the front anchors are mounted to the side rails and are positionable there along at a plurality of locations.

18. The apparatus of claim 17 wherein the side rails have a tonneau cover mounting portion for mounting a tonneau cover to the side rails, a first accessory mounting portion outboard of the tonneau cover mounting portion for mounting an accessory to the rails above the tonneau cover mounting portion and a second accessory mounting portion below the tonneau cover mounting portion for mounting an accessory to the rails below the tonneau cover mounting portion whereby a tonneau cover can be mounted to the rails between the two spaced side walls while a first accessory can be mounted to the first accessory mounting portion above the tonneau cover and a second accessory can be mounted to the second accessory mounting portion below the tonneau cover; and     the front anchors are mounted to the second accessory mounting portion of the side rails.

19. The apparatus of claim 18 wherein the second accessory mounting portion of each rails is an inwardly open channel open to the interior of the cargo box.

20. An accessory system for a vehicle body having spaced elongated vertical side walls having upper ends, the side walls defining an interior space therebetween which is open from above, the accessory system comprising, an elongated side rail extending along each side wall adjacent the upper ends thereof, each side rail having a tonneau cover mounting portion for mounting a tonneau cover to the side rail, a first accessory mounting portion outboard of the tonneau cover mounting portion for mounting an accessory to the rails outboard of the tonneau cover mounting portion and a second accessory mounting portion below the tonneau cover mounting portion for mounting an accessory to the rails below the tonneau cover mounting portion, at least one cargo tie down anchor attached to the second accessory mounting portion and a cargo net attached to the at least one cargo tie down anchor, whereby the tonneau cover can be mounted to the rails between the two spaced side walls while a first accessory can be mounted to the first accessory mounting portion above the tonneau cover and a second accessory can be mounted to the second accessory mounting portion below the tonneau cover, at least one cargo tie down anchor attached to the second accessory mounting portion.

* * * * *